Figure 1:
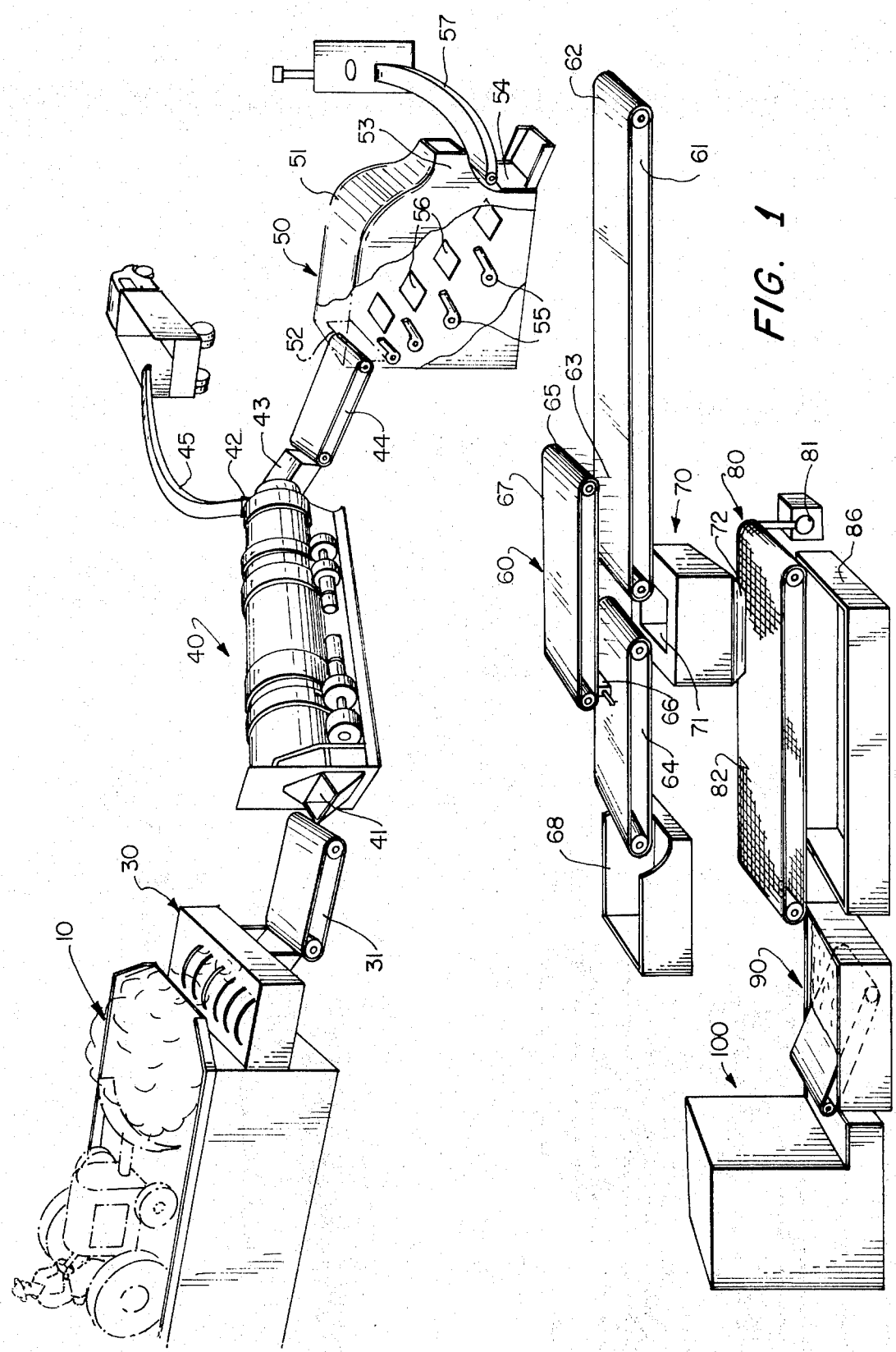

United States Patent [19]
Boyd

[11] 3,802,631
[45] Apr. 9, 1974

[54] WASTE SEPARATING AND RECYCLING SYSTEM

[76] Inventor: John A. Boyd, 3314 Holloman Rd., Falls Church, Va. 22042

[22] Filed: Oct. 12, 1972

[21] Appl. No.: 296,994

[52] U.S. Cl................ 241/20, 241/24, 241/25, 241/68, 241/101 R
[51] Int. Cl. ............................................ B02c 19/12
[58] Field of Search ............ 241/20, 21, 24, 25, 27, 241/62, 68, 79, 81, 101, DIG. 26

[56] References Cited
UNITED STATES PATENTS

| | | | |
|---|---|---|---|
| 3,549,092 | 12/1970 | Baxter | 241/24 X |
| 3,604,179 | 9/1971 | Lund | 241/24 X |
| 3,660,038 | 5/1972 | Brewer | 241/101 R X |
| 3,670,968 | 6/1972 | Galeano | 241/21 |
| 3,720,380 | 3/1973 | Marsh | 241/20 |

Primary Examiner—Granville Y. Custer, Jr.
Attorney, Agent, or Firm—Roylance, Abrams, Berdo & Kaul

[57] ABSTRACT

A method and apparatus for separating waste material into its various component parts for the recycling and reuse of each of those component parts. The various component parts of waste material which can be separated by this method and apparatus are soluble wastes, plastic material, glass, ferrous metal and non-ferrous metal.

9 Claims, 2 Drawing Figures

WASTE SEPARATING AND RECYCLING SYSTEM

This invention relates to a waste separating and recycling system and more particularly it relates to a system which separates waste material or garbage into its component parts such as organic soluble material, plastic material, glass, ferrous metal, and non-ferrous metal to enable these parts to be recycled.

Each day many tons of material are discarded as garbage and are never reused. The supply of natural resources, being finite, is thus slowly being depleted. Additionally, the facilities for receiving refuse, such as land fills and incinerators, have shortcomings. The areas of land available for dumping refuse are becoming scarce and expensive. The incinerators which are sometimes used to burn discarded refuse also contribute to harmful air pollution. The prior art devices for separating waste material from discarded garbage with a view towards recycling the material have all been limited to removing only one specific material at a time from the discarded garbage. The basic problem in accomplishing a viable method and apparatus for separating waste material into its component parts for recycling purposes is to provide a method and apparatus which can separate essentially all of the component parts of the material that is discarded.

It is an object of the present invention to overcome the limitations and drawbacks associated with the aforesaid prior art separating systems and to provide a new and improved waste separating system.

Another object of the present invention is to separate waste material into substantially all of its component parts to allow for the recycling of all of these parts.

Another object of the present invention is to provide an economically viable system for the separation of waste material into its component parts.

A further object of the present invention is to provide a system for the separation of waste material into soluble organic material, plastic material, glass, ferrous metal and non-ferrous metal.

A further object of the present invention is to provide a waste separating system which can separately collect non-ferrous metal.

Other objects, advantages, and salient features of the present invention will become apparent from the following detailed description, which taken in conjunction with the annexed drawings, discloses a preferred embodiment of the present invention.

Figure 2:
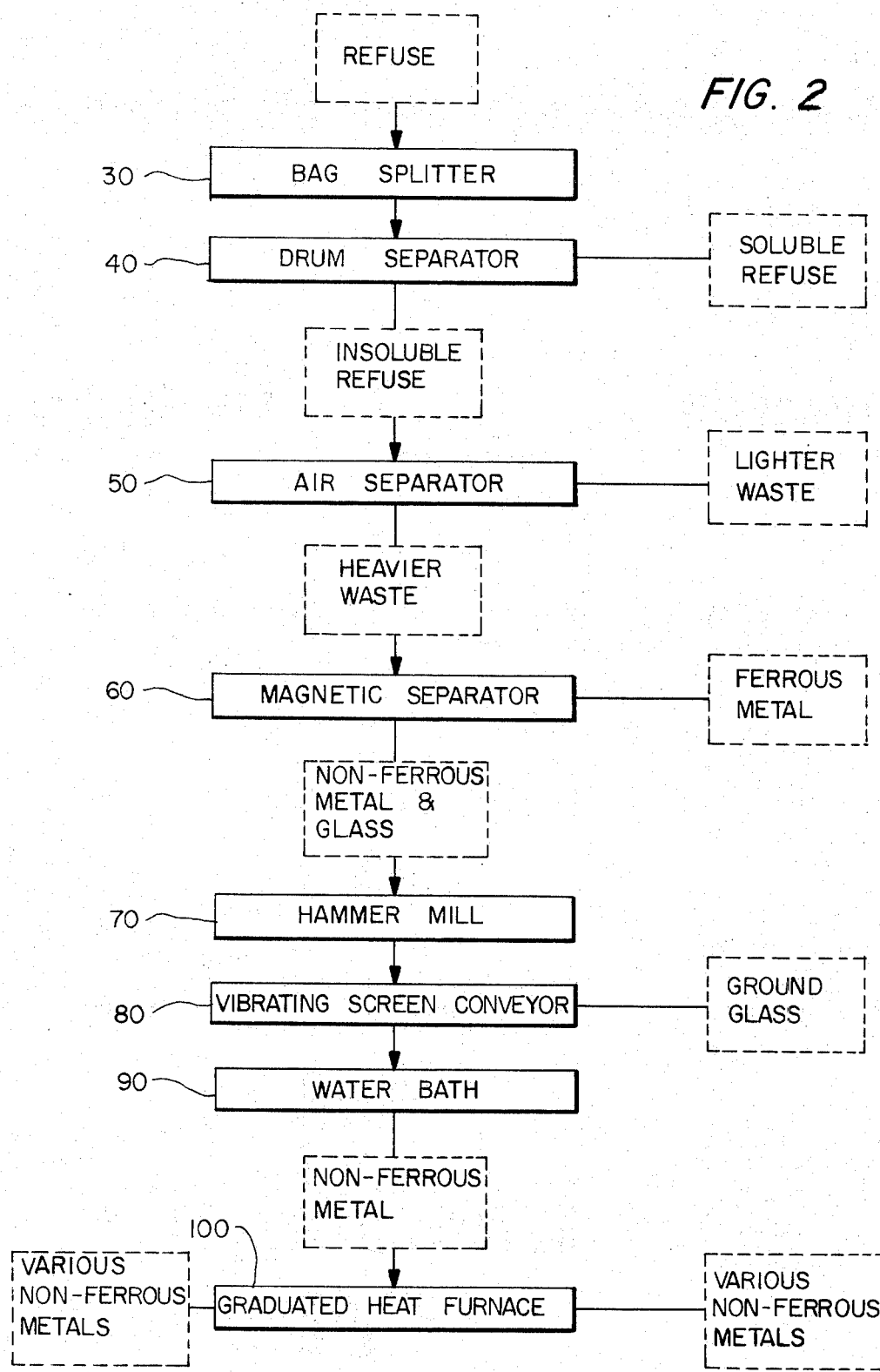

Referring now to the drawings, which form a part of this original disclosure:

FIG. 1 is a diagrammatic view of the system of the present invention showing its individual components; and FIG. 2 is a flow diagram in block form showing the present invention and the stages thereof where the component parts of the waste material are removed.

The foregoing objects are obtained by initially conveying the waste material or refuse into a bag splitter to open the bagged refuse and then into a drum separator which separates soluble and non-soluble material. The soluble material is conveyed away to be used as compost. The insoluble material is conveyed to an air-separator which utilizes air blowers to separate lighter refuse and heavier refuse. The lighter refuse, such as plastic material, is blown upwards and removed from the system. The heavier refuse falls by gravity to an outlet and is conveyed through a magnetic separator which removes the ferrous metal from the refuse and bales it. The remaining material is conveyed to a hammer mill which grinds up the refuse and is then passed over a vibrating conveyor screen to remove any ground glass material. The waste material is then conveyed through a water bath and skimmer which removes any debris coating the remaining waste material which material is basically non-ferrous metal. The purified non-ferrous metal is conveyed into a graduated heat furnace line which melts the non-ferrous metals at different temperatures and collects them separately.

Referring to the drawings in further detail, as shown in FIG. 1, the system of the present invention consists generally of a bag splitter 30, a drum separator 40, an air separator 50, a magnetic separator 60, a hammer mill 70, a vibrating screen conveyor 80, a water bath and skimmer 90 and a graduated heat furnace 100.

The trash to be separated into its component parts is first delivered to a collecting point indicated in FIG. 1 as 10, generally in a bagged condition. Adjacent the collecting point is a conventional bag splitter 30 which will cut open the bags and empty the refuse therefrom. The refuse is then moved by way of conveyor 31 into an inlet 41 in the adjacent drum separator 40 as shown in FIG. 1. The drum separator 40 can be a conventional separating device such as that disclosed in U.S. Pat. No. 3,113,733 to Carlson. The drum separator is preferably of the type which includes a rotary drum and a central water supply to form a slurry of refuse which, during the rotation of the drum, is forced outward by centrifugal force to pass through one or several screens. The drum separator 40 separates the waste material into soluble and insoluble material. An outlet 42 at one end of the drum separator 40 opposite the inlet 41 and a conveyor 45 adjacent the outlet 42 are provided for the soluble material. Another outlet 43 at the same end of the drum separator 40 as the outlet 42 is provided for the insoluble material. The soluble material, namely, that material which is dissolved sufficiently to pass through the screens, discharges through the outlet 42 and is transferred via the conveyor 45 to a collection point, where the material can be collected to be used as compost. The insoluble material, which was not dissolved enough to pass through the screens, discharges through the outlet 43 and is transferred via a conveyor 44 to the air separator 50.

As seen in FIG. 1, the air separator 50 is formed from a housing 51 which has an inlet 52 adjacent its top portion at one end, for receiving material from the conveyor 44. At the other end spaced substantially midway between the top and bottom of the housing 51 is an outlet 53. Below the outlet 53 and at the same end of the housing 51 is another outlet 54. The interior of the housing 51 forms a chamber or plenum within which is located a series of high pressure air blowers 55. The blowers 55 are spaced along the length of the housing 51 from the inlet 52 to the outlet 54. The air stream from each blower outlet is aimed at outlet 53. A first air blower 55 is located adjacent the inlet 52. Each successive air blower is mounted slightly lower and slightly closer to the outlet 54 than the preceding blower. Mounted above each air blower 55 is a short flat ramp 56. Each ramp 56 is parallel to a line connecting the inlet 52 and the outlet 54 and has a length extending from one blower outlet to the next. Leading from the outlet 53 is a conventional conveyor 57. Within the air separator chamber, the lighter materials such as plastics will be supported by the air streams and will pass through the outlet 53. The heavier materials such as metals, which are too heavy to be supported by the air streams, will slide down the ramps 56 and exit through the outlet 54.

Located beneath the outlet 54 is a conventional endless conveyor 61 having one end 62 positioned for receiving the heavier material expelled through the outlet 54. Spaced from the other end 63 of the conveyor 61 is an endless conveyor 64 which is substantially parallel to the conveyor 61 and in substantially the same horizontal plane as the conveyor 61. Located above and spanning the space between the conveyors 61 and 64 is an endless belt conveyor 65 which is substantially parallel to the conveyors 61 and 64 and has one end located over the conveyor 61 and another end located over the conveyor 64. The conveyor 65 includes an endless belt 67 which is impregnated with magnetic material to attract ferrous metal in the waste material. A bar 66 is rigidly mounted to the frame of the conveyor 65 in a position to strip metal adhered to the bottom run of the conveyor 65 on to the conveyor 64. The conveyor 64 leads directly into a conventional baling machine 68 which receives ferrous metal and forms it into bales.

The hammer mill 70 has an inlet 71 located beneath the space provided between conveyors 61 and 64 and receives material carried on the conveyor 61 which is not attracted to the magnetic belt 67. The hammer mill 70 can be of any conventional type which can comminute the material passing therethrough.

An outlet 72 located at the bottom of the hammer mill 70 communicates with a vibrating screen conveyor 80. The vibrating screen conveyor 80 is formed from an endless conveyor which is vibrated and has a conveying surface comprised of a screen or porous wire matrix 82. The vibration can be provided to the frame of the conveyor 80 by any suitable means such as a shaft connected thereto which is dirven on an eccentric gear 81. The vibrating screen conveyor is oriented such that its first end for receiving material is located beneath the outlet 72 from the hammer mill 70 and the other end is adjacent the water bath 90. Below the vibrating conveyor screen 80 is a collecting bin 86 to collect ground material which drops through the vibrating screen.

The water bath 90, which receives the material from the conveyor 80 which is too large to fall therethrough, is any conventional bath and skimmer device which can wash material and skim off any debris coating the material delivered to it. Receiving the cleansed material from the bath 90 is a graduated heat furnace 100 which can be any conventional type, such as that described in U.S. Pat. No. 3,339,905 to Tezuka.

In operation, as shown in the flow diagram of FIG. 2, the trash or refuse is first delivered to a collecting area 10 and from there is transferred into a bag splitter 30 where the bags are cut to free the refuse contained therein. From there the refuse is transferred via the conveyor 31 to the inlet 41 of the drum separator 40 which separates the material into soluble and insoluble waste matter. The soluble waste matter is expelled through outlet 42. This soluble material is conveyed away on conveyor 45 and used as rapid compost. The drum separator 40 expels the non-soluble material through the outlet 43. This non-soluble material is deposited onto the conveyor 44 and is conveyed to the inlet 52 in the air separator 50. The non-soluble material entering the inlet 52 is exposed to the high pressure blast of air from the blowers 55. The lighter parts of the material, such as plastics, are blown upwards, forwards and through the outlet 53. The heavier waste material falls toward the bottom of the housing 51 under the influence of gravity and moves successively down the ramps 56 to the outlet 54. The lighter material that has been expelled through the outlet 53 is conveyed away on conveyor 57 to be recycled.

The heavier material expelled from the outlet 54 falls directly onto the conveyor 61 at its end 62. This conveyor 61 moves the material towards the magnetic conveyor 65. The magnetic conveyor 65, moving along a portion of the length of the conveyor 61 and spaced just above it, will attract ferrous metal in the material on the conveyor 61 and the ferrous metal will become adhered to it. This ferrous material adhered to the conveyor 65 is moved towards the conveyor 64 upon which it is deposited through the action of the stripping bar 66. The ferrous material is then carried along the conveyor 64 and is deposited in the baling machine 68 where it is formed into bales.

The rest of the material on the conveyor 61 is not influenced by the magnetic conveyor 65 and simply drops off the end of the conveyor 61 into the hammer mill 70 through the space defined between the conveyors 61 and 64.

The hammer mill 70 shreds, tears or otherwise comminutes the material into small pieces. Any glass material that is fed into the hammer mill will be broken and ground. As the material exits through the outlet 72 in the hammer mill 70 it falls upon the vibrating screen conveyor 80. Any ground glass contained in the material at this time falls through the small holes in the vibrating screen conveyor and is collected below in a bin 86. Ordinarily, because of its fragile nature, the glass items passing through the hammer mill will be broken and ground into particles much smaller than the metallic and other items. Thus, by forming fine holes in the vibrating screen conveyor 80, the glass particles will ordinarily drop through while the remaining particles or fragments will not. The remaining refuse that is too large to fall through the screen is conveyed along the vibrating screen conveyor 80 and is deposited in the water bath 90 wherein impurities will be removed therefrom. The purified material which is primarily non-ferrous metal is then passed through a graduated heat furnace 100 at which time the various metals will be melted at different temperatures and collected separately.

While one advantageous embodiment has been chosen to illustrate the invention, it will be understood by those skilled in the art that various changes and modifications can be made therein without departing from the scope of the invention as defined in the appended claims.

I claim:

1. An apparatus for separating waste material into its component parts for separately collecting said component parts, comprising:
   collection means for receiving the waste material;
   rotary separator means for separating soluble and insoluble waste material;
   pneumatic separator means for separating the insoluble waste material into lighter and heavier constituents;

magnetic separating means for separating ferrous metal from the heavier constituents;

comminuting means for reducing the remaining insoluble material into particulate matter;

purifying means for washing the particulate matter; and graduated heat furnace means for separately melting the various non-ferrous metals remaining in the purified particulate matter.

2. Apparatus according to claim 1 wherein said rotary separator means includes a drum separator.

3. Apparatus according to claim 2 wherein said pneumatic separator means comprises a housing having an inlet and first and second outlets;

a series of spaced air blowers mounted in said housing for blowing said lighter constituents out said first outlet; and a series of spaced ramps mounted between said air blowers for receiving said heavier constituents that are not influenced by said air blowers and conveying said haveier constituents to said second outlet.

4. Apparatus according to claim 3 wherein said communiting means includes a hammer mill.

5. Apparatus according to claim 4 further including a screen means for separating ground glass particles received from said comminuting means, said screen means comprising a vibrating endless conveyor having a perforated conveying surface to allow ground glass particles to pass therethrough.

6. Apparatus according to claim 5 wherein said magnetic separator means includes an endless conveyor belt having magnetic material embedded in the surface thereof and a bar mounted across said belt to strip adhered ferrous metals therefrom.

7. Apparatus according to claim 5 and further including a transfer means for conveying the insoluble materal from said rotary separator means to said pneumatic separator means; and means for separately collecting said soluble material, said lighter constituents, said ground glass particles and said ferrous metal.

8. A method for separating waste material into its component parts for separately collecting said component parts, comprising the steps of:

treating the waste material to separate soluble and insoluble material;

collecting the soluble material;

treating the insoluble material to separate the insoluble material into heavier and lighter constituents;

collecting the lighter constituents;

separating ferrous metal from the heavier constituents and baling said ferrous metal;

comminuting the remaining material;

separating ground glass from the remaining comminuted material and collecting said ground glass;

washing the remaining material and removing debris therefrom; and heating the debris free remaining material to separately melt each different non-ferrous metal contained therein and collecting each non-ferrous metal separately.

9. A method according to claim 8 wherein said step of treating the insoluble material comprises supporting the lighter material in an air stream which directs said lighter material toward a location where said step of collecting the lighter material is performed.

* * * * *